US007345688B2

(12) United States Patent
Baudisch et al.

(10) Patent No.: US 7,345,688 B2
(45) Date of Patent: Mar. 18, 2008

(54) SEMANTIC THUMBNAILS

(75) Inventors: Patrick Markus Baudisch, Seattle, WA (US); Heidi Lap Mun Lam, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 10/968,875

(22) Filed: Oct. 18, 2004

(65) Prior Publication Data

US 2006/0085743 A1   Apr. 20, 2006

(51) Int. Cl.
*G06T 11/00* (2006.01)
(52) U.S. Cl. ................... 345/467; 345/471; 345/472
(58) Field of Classification Search ............... 345/744, 345/800; 707/540
See application file for complete search history.

(56) References Cited

U.S. PATENT DOCUMENTS

| | | | | |
|---|---|---|---|---|
| 4,864,628 A | * | 9/1989 | Scott | 382/197 |
| 5,384,703 A | * | 1/1995 | Withgott et al. | 715/531 |
| 5,598,520 A | * | 1/1997 | Harel et al. | 345/469 |
| 6,134,532 A | * | 10/2000 | Lazarus et al. | 705/14 |
| 6,272,484 B1 | * | 8/2001 | Martin et al. | 707/1 |
| 6,279,018 B1 | * | 8/2001 | Kudrolli et al. | 715/540 |
| 6,311,180 B1 | * | 10/2001 | Fogarty | 707/4 |
| 6,456,305 B1 | * | 9/2002 | Qureshi et al. | 715/800 |
| 6,593,944 B1 | * | 7/2003 | Nicolas et al. | 715/744 |
| 6,993,726 B2 | * | 1/2006 | Rosenholtz et al. | 715/835 |
| 7,068,723 B2 | * | 6/2006 | Foote et al. | 375/240.25 |
| 7,155,043 B2 | * | 12/2006 | Daw | 382/128 |
| 2001/0054049 A1 | | 12/2001 | Maede et al. | |
| 2002/0073235 A1 | | 6/2002 | Chen et al. | |
| 2002/0191031 A1 | * | 12/2002 | Ricard | 345/838 |
| 2003/0133612 A1 | * | 7/2003 | Fan | 382/199 |
| 2004/0100510 A1 | * | 5/2004 | Milic-Frayling et al. | 345/864 |
| 2004/0148571 A1 | * | 7/2004 | Lue | 715/514 |
| 2005/0097444 A1 | * | 5/2005 | Ivarsey et al. | 715/501.1 |
| 2005/0210399 A1 | * | 9/2005 | Filner et al. | 715/767 |
| 2006/0195784 A1 | * | 8/2006 | Koivisto et al. | 715/523 |

OTHER PUBLICATIONS

Badros, G.J., "Cassowary: A Constraint Solving Toolkit," Last updated Feb. 12, 2003, <http://www.cs.washington.edu/research/contraints/cassowary/> [retrieved Oct. 15, 2004].
Baudisch, P., and C. Gutwin, "Multiblending: Displaying Overlapping Windows Simultaneously Without the Drawbacks of Alpha Blending," *Proceedings of Conference on Human Factors in Computing Systems*, Vienna, Austria, Apr. 24-29, 2004, pp. 367-374.

(Continued)

*Primary Examiner*—Doug Hutton
*Assistant Examiner*—Gregory A DiStefano
(74) *Attorney, Agent, or Firm*—Christensen O'Connor Johnson Kindness PLLC

(57) ABSTRACT

A method is provided for displaying a page formed of discrete elements, such as a Web page, on different computing devices. The method converts the page into a semantic thumbnail, which preserves the overall appearance of the page and displays readable text segments that enable a user to identify main areas of the page. The semantic thumbnail is adaptable to different screen sizes and target font sizes. The method enlarges unreadable text segments in a miniature version of the page. The method also trims the enlarged text segments to fit the width of the semantic thumbnail by summarizing or cropping text in the enlarged text segments.

21 Claims, 12 Drawing Sheets

OTHER PUBLICATIONS

Bell, B.A., et al., "An Annotated Situation-Awareness Aid for Augmented Reality," *Proceedings of the 15th Annual ACM Symposium on User Interface Software and Technology*, vol. 4, No. 2, Paris, Oct. 27-30, 2002, pp. 213-216.

Bell, B.A., et al., "View Management for Virtual and Augmented Reality," *Proceedings of 14th Annual ACM Symposium on User Interface Software and Technology*, Orlando, Florida, Nov. 11-14, 2001, pp. 101-110.

Bell, B.A., and S.K. Feiner, "Dynamic Space Management for User Interfaces," *Proceedings of ACM Symposium on User Interface Software and Technology*, San Diego, Nov. 5-8, 2000, pp. 238-248.

Bell, B.A., et al., "View Management for Virtual and Augmented Reality," Last updated Mar. 30, 2004, <http://www1.cs.columbia.edu/graphics/projects/ViewManagement/> [retrieved Oct. 15, 2004]; also found in *Proceedings of User Interface Software and Technology 2001*, Orlando, Florida, Nov. 11-14, 2001, pp. 101-110.

Buyukkokten, O., et al., "Efficient Web Browsing on Handheld Devices Using Page and Form Summarization," *ACM Transactions on Information Systems* 20(1):82-115, Jan. 2002.

Dziadosz, S., and R. Chandrasekar, "Do Thumbnail Previews Help Users Make Better Relevance Decisions About Web Search Results?" *Proceedings of the 25th Annual International ACM SIGIR Conference on Research and Development in Information Retrieval*, Tampere, Finland, Aug. 11-15, 2002, pp. 365-366.

Gajos, K., and D.S. Weld, "SUPPLE: Automatically Generating User Interfaces," *Proceedings of the 9th International Conference on Intelligent User Interface*, Madeira, Funchal, Portugal, Jan. 13-16, 2004, pp. 93-100.

Good, L.E., "Zoomable User Interfaces for the Authoring and Delivery of Slide Presentations," doctoral dissertation, Graduate School of the University of Maryland, 2003, 204 pages.

Good, L.E., et al., "Automatic Text Reduction for Changing Size Constraints," *Proceedings of Conference on Human Factors in Computing Systems*, Minneapolis, Minnesota, Apr. 20-25, 2002, pp. 798-799.

Lawton, D.T., and E.J. Feigin, "Streaming Thumbnails Combining Low Resolution Navigation and RSVP Displays," *Proceedings of Conference on Human Factors in Computing Systems*, The Hague, Netherlands, Apr. 1-6, 2000, pp. 159-160.

Miller, J., "Bitstream Betas Thunderhawk Browser for Smartphones," *SmartPhoneToday News*, Feb. 24, 2004, <http://www.smartphonetoday.com/articles/2004/2/2004-2-24-Bitstream-Betas-Thunderhawk . . . > [retrieved Oct. 15, 2004].

O'Hara, K., et al., "Supporting Memory for Spatial Location While Reading From Small Displays," *Proceedings of Conference on Human Factors in Computing Systems*, Pittsburgh, Pennsylvania, May 15-20, 1999, pp. 220-221.

Paley, W.B., "Better Transparent Overlays by Applying Illustration Techniques and Vision Findings," *Proceedings of the 16th Annual ACM Symposium on User Interface Software and Technology*, Vancouver, Canada, 2003, Conference Supplement, pp. 57-58.

Suh, B., et al., "Automatic Thumbnail Cropping and Its Effectiveness," *Proceedings of the 16th Annual ACM Symposium on User Interface Software and Technology*, Vancouver, Canada, 2003, pp. 95-104.

Suh, B., et al., "Popout Prism: Adding Perceptual Principles to Overview=Detail Documents Interfaces," *Proceedings of Conference on Human Factors in Computing Systems*, vol. 4, No. 1, Minneapolis, Minnesota, Apr. 20-25, 2002, pp. 251-258.

Woodruff, A., et al., "Using Thumbnails to Search the Web," *Proceedings of Conference on Human Factors in Computing Systems*, vol. 3, No. 1, Seattle, Washington, Mar. 31-Apr. 5, 2001, pp. 198-205.

Baudisch, P., et al., "Collapse-to-Zoom: Viewing Web Pages on Small Screen Devices by Interactively Removing Irrelevant Content," in *Proceedings of UIST '04 (Technote)*, Santa Fe, NM, Oct. 24-27, 2004, pp. 91-94.

Berkner, Kathrin, et al., "SmartNails—Display and Image Dependent Thumbnails," *Proceedings of the International Society for Optical Engineering* 5296:54-65, San Jose, Calif., Jan. 21, 2004.

Chen, H., and P. Mohapatra, "A Novel Navigation and Transmission Technique for Mobile Handheld Devices," *Proceedings of the 23rd International Conference on Distributed Computing Systems*, Providence, R.I., May 19-22, 2003, 8 pp.

Lam, H., and P. Baudisch, "Summary Thumbnails: *Readable* Overviews for Small Screen Web Browsers," *Proceedings of the Conference on Human Factors in Computing Systems*, Portland, Ore., Apr. 2-7, 2005, pp. 681-690.

\* cited by examiner

SEMANTIC THUMBNAILS

FIELD OF THE INVENTION

The invention relates in general to computer programs and, in particular, to computer programs for providing semantic thumbnails.

BACKGROUND OF THE INVENTION

Explosive growth in computer networks in the last two decades has changed the uses of computers dramatically. The largest computer network, commonly known as the Internet, is now connecting millions of computers together, providing services like e-mail, file transfer, and the World Wide Web ("WWW")—hypermedia information retrieval across different computer platforms. Meanwhile, small mobile computing devices, such as personal digital assistants (PDAs) including hand-held and palm-type computers and the like, are becoming more popular for use by business people and others who must travel. Increasingly, users of small mobile computing devices are able to connect to computer networks such as the WWW to download and view WWW content.

Most existing Internet content is designed for desktop computers and is therefore not always well suited for smaller computing devices. In particular, Web pages usually are designed with a desktop screen in mind. Many Web pages use multi-column layouts and/or are pre-formatted to a certain page width. For example, FIG. 1A illustrates a Web page 100A that is designed for a desktop screen. The Web page 100A has three columns, wherein the left column contains a text block 104A, the center column contains an image 106A, and the right column contains another text block 108A. On a small screen device, such as a PDA, it often is hard to read the content of a Web page such as Web page 100A. If the Web page 100A is rendered in a desktop-like two-dimensional layout on a small form factor, i.e., small screen, device, a user has to scroll extensively, both horizontally and vertically, in order to find and view material relevant to the user.

To reduce the need for extensive within-page browsing and scrolling, different approaches have been proposed to render a desktop Web page 100A on small screen devices. Currently, there are four general approaches: device-specific authoring; multi-device authoring; automatic re-authoring; and client-side navigation. The first two obtain high-quality results by taking the specifics of the small screen device into account during page authoring. In exchange, they require the cooperation of the individual Web page authors. This prevents these techniques from being applied to already-existing Web pages, which limits the practical applicability of these approaches.

Contrariwise, automatic re-authoring does not require the collaboration of page authors or use their efforts. Therefore, automatic re-authoring is a more encompassing approach. In general there are two main approaches for automatic re-authoring. The first approach is page reformatting. The second approach is page scaling.

The most popular example of page reformatting is to arrange a multi-column Web page 100A into a single column to fit the width of a small screen. For example, the Small-Screen Rendering™ program provided by opera.com takes such an approach. Single-column views eliminate the need of horizontal scrolling. However, single-column views considerably change overall page layout and require a corresponding larger amount of vertical scrolling. For a typical desktop Web page 100A, single-column views can turn the Web page 100A into several PDA screens worth of material. FIG. 1B shows a single-column view 100B of the Web page 100A illustrated in FIG. 1A. As illustrated in FIG. 1B, the text blocks 104A, 108A and the image 106A of the Web page 100A are concatenated to form a single column of text block 104B, image 106B, and text block 108B. As a result, a user of the Web page 100B has to use the vertical scroll bar 110 extensively in order to view the content of the Web page 100B.

Other page reformatting approaches increase font sizes of text and/or remove images in a desktop Web page. Such approaches affect the visual appearance of the Web page and thus often prevent users from recognizing the Web page. For example, software such as the Power Browser provided by the Stanford Power Browser Project reduces page size by leaving out images and by removing white spaces. Another text-based approach preserves the layout of the text, but does not retain the images.

The main drawback of the page reformatting approaches is that they abandon the layout information of a Web page, which prevents users from leveraging past experience with the Web page or even recognizing the Web page. They also can affect the layout of the Web pages intended by the original authors. Therefore, page reformatting hinders the transfer of users' reading knowledge and experience with a desktop Web page to small screen devices.

To avoid the drawbacks of the page reformatting approach, researchers have proposed page-scaling approaches that preserve the original layout of Web pages. These approaches provide users with a miniature version of a Web page as a thumbnail (hereinafter "traditional thumbnail"). A traditional thumbnail generally keeps the overall appearance of the original Web page, thereby allowing users to recognize the Web page and to identify main areas. However, because the text content of the Web page is generally unreadable in a traditional thumbnail, traditional thumbnail text is not directly consumable. FIG. 1C illustrates a traditional thumbnail 100C, which is a miniature version of the Web page 100A illustrated in FIG. 1A. As shown in FIG. 1C, the traditional thumbnail 100C preserves the overall appearance of the original Web page 100A. However, in the traditional thumbnail 100C, the text in the text blocks 104C and 108C and possibly the image 106C of the Web page 100A becomes unreadable and/or unrecognizable. That is, a user cannot readily read the content in the text blocks 104C, 108C; and the image 106C may not be clearly recognizable. A user has to repeatedly zoom in to locate content of interest. Thus, such a size reduction forces a user to explore the content of the Web page 100A in a time-consuming way.

Other page scaling approaches involve text summarization, which augments traditional thumbnails by highlighting the keywords in the content based on user input. However, the applicability of enhancing traditional thumbnails with user input keywords is limited to these cases where users can capture their intent with keywords. Even if users are able to express their intent verbally, this approach often fails due to vocabulary problems. Also, due to language ambiguities, the relevancy of material on a page is more easily determined when the keywords can be viewed in context.

In summary, a traditional thumbnail 100C of a desktop Web page 100A captures the layout, the look and feel of the page. This allows a user to visually match the page with past viewing experience. However, traditional thumbnails often make the content of the Web page 100A unrecognizable. The present invention is directed to overcoming the foregoing problems associated with displaying pages, such as Web pages, on small screen display devices, such as PDAs.

SUMMARY OF THE INVENTION

The invention provides a computer-implemented method, a computer-readable medium, and a computing system for converting a page, such as a Web page, into a semantic thumbnail suitable for displaying on the screen of a small form factor computing device, such as a PDA, cellular telephone, etc. The semantic thumbnail maintains the overall appearance of the page while disambiguating (clarifying) the text content of the page. More specifically, the text content is presented in a readable form even though the overall page is shrunk to fit the small display screen.

One exemplary embodiment of the invention converts a Web page into a semantic thumbnail suitable for displaying on a small form factor computing device requesting the Web page. The Web page is loaded upon receiving a request for the Web page from the computing device and information about the computing device is obtained. Such information includes the target width of the semantic thumbnail and the minimum font size that ensures text to be readable on a computing device. The Web page is then converted into a semantic thumbnail suitable for display on the computing device. The semantic thumbnail has the same layout as the original Web page and readable text.

In accordance with one aspect of the invention, converting a Web page into a semantic thumbnail includes (1) processing the Web page so the text will be readable in the semantic thumbnail and (2) scaling the Web page to the target width of the semantic thumbnail. These two actions can be performed in either order. In the case that action (1) is performed first, the text is enlarged to an intermediate font size, so the text will be readable once the Web page is scaled in action (2).

In accordance with another aspect of the invention, processing the Web page so the text will be readable in the semantic thumbnail includes partitioning the Web page into elements. The elements can be paragraphs of text, input boxes, option boxes, or any other specific units. A threshold value is then calculated. For a Web page that has not been scaled to the target width of the semantic thumbnail, the threshold value is an intermediary font size. The intermediary font size ($F_i$) is the result of multiplying the minimum font size ($F_m$) with the ratio between the display width of the Web page ($W_{wp}$) and the target width of the semantic thumbnail ($W_{sm}$).

$$Fi = F_m * \frac{W_{wp}}{W_{sm}}$$

For a Web page that has been scaled, the threshold value is the minimum font size that ensures text in the semantic thumbnail to be readable in the computing device.

Each element in the Web page is then processed to see if the text in an element is smaller than the threshold value. In the case that the text in an element is smaller than the threshold value, the method enlarges the text in the element to the threshold value. Then the enlarged text is trimmed to fit into the width of the element.

In accordance with yet another aspect of the invention, when trimming the enlarged text in an element so it fits into the width of the element, selected words in each line of the enlarged text are removed so the remaining text fits the width of the element. Preferably, the removed words have the highest frequencies of appearances in the language the text is written in. Such embodiments of the invention are based on the assumption that the more often a word is used in a language, the less significance the word has toward the meaning of text written in the language. Alternatively, trimming the enlarged text in an element includes preserving in each line of the enlarged text only words that occur frequently in the text, but rarely in the language that the text is written in. On the other hand, trimming the enlarged text in an element comprises preserving in each line of the enlarged text special terms, such as search terms or terms contained in the user profile describing interests of the current user of the computing device. In situations where the width of the element cannot accommodate even one word, a word selected from the enlarged text is cropped to fit the width of the element.

In accordance with a further aspect of the invention, for a computing device that does not have a scaling capability, the Web page is processed and scaled before downloading to the computing device. For a computing device that has scaling capability, the Web page is processed, downloaded to the computing device, and then scaled before the resultant semantic thumbnail is displayed.

In accordance with one aspect of the invention, a semantic thumbnail can be zoomed into a detail view, which displays the unabbreviated version of the Web page. The detail view may display the Web page in its desktop format or in a single-column view. Alternatively, the detail view displays a shrunken version of the Web page that fits the display screen of the computing device. The semantic thumbnail and the detail view look similar enough for a user to maintain a sense of which areas in the semantic thumbnail correspond to which areas in the detail view.

In accordance with yet another aspect of the invention, readable text segments of a semantic thumbnail may be displayed on top of a traditional thumbnail image of the Web page. The traditional thumbnail image of the Web page is used as a background for displaying the readable text segments of the semantic thumbnail.

In summary, the invention provides a computer-implemented method, a computer-readable medium, and a computing system that generates a semantic thumbnail of a page, such as a Web page, suitable for displaying on a computing device. The semantic thumbnail preserves the overall appearance of the page and disambiguates (i.e., clarifies) the text content of the page. As a result, the invention enables a user to leverage the user's prior experience with the page and quickly identify the content of interest.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the invention provide a computing system, a computer-implemented method, and a computer-readable medium for viewing pages, such as Web pages, on small form factor computing devices. More specifically, the invention converts a page formed of discrete elements, such as a Web page, into a semantic thumbnail suitable for displaying on a computing device. The semantic thumbnail preserves the overall appearance of the page and disambiguates content in the page. More specifically, in order to address the space limitation provided by the computing device requesting the page, the method summarizes or crops text located in the elements of the page such that the text is readable. The semantic thumbnail thus enables a user to leverage the user's prior experience with the appearance of the page and to quickly identify the main areas of interest in the page without extensive exploration of the page.

Although the invention will primarily be described in the context of processing HTML documents, and is described in the context of a Web page, those skilled in the relevant art and others will appreciate that the invention is also applicable to other hypertext languages as well as other types of documents, such as maps, blueprints, images, spreadsheets, etc. Also, the invention will primarily be described in the context of small form factor computing devices, such as PDAs and cellular telephones, for example. However, it is to be understood that some aspects of the invention may also be applicable in other contexts of which the following are only examples. For example, aspects of the invention may be used to present search results information. Aspects of the invention may also be used to present preview information. In addition, the invention may be adapted for users who are visually impaired by displaying content in a summarized version and in more readable format.

The following description first provides an overview of a computing system in which the invention may be implemented. Then a computer-implemented method is described. The computer-implemented method converts (i.e., shrinks) a Web page into a semantic thumbnail suitable for displaying on a computing device. The semantic thumbnail preserves the overall appearance of the Web page and disambiguates (clarifies) content of the Web page. The clarification is such that the text of the semantic thumbnail is readable. The text may be a truncated version of the original text if the creation of the thumbnail reduces the original text to an unreadable size. The illustrative examples provided herein are not intended to be exhaustive or to limit the invention to the precise forms disclosed. Similarly, any steps described herein may be interchangeable with other steps, or combinations of steps, in order to achieve the same result.

Figure 2:
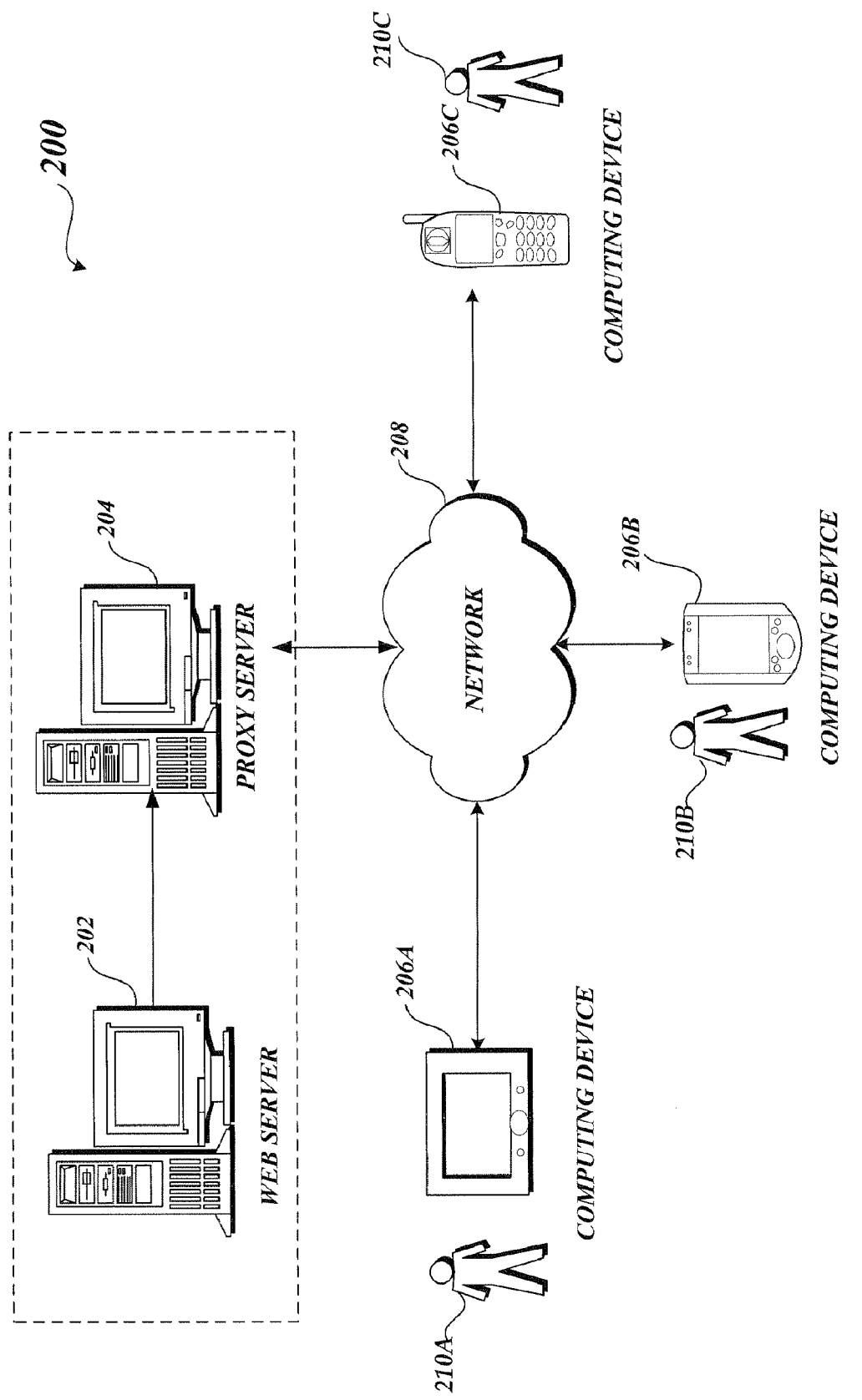
FIG. 2 is a pictorial diagram illustrating one exemplary computing system suitable for implementing the invention.

FIG. 2 illustrates an exemplary computer system 200 suitable for implementing the invention. The illustrated computer system 200 comprises a plurality of computing devices 206A, 206B, 206C, at least some of which are small form factor computing devices, and a Web server 202. The Web server 202 may be a computer that is associated with an organization that provides content via the Internet.

The computing devices 206A-206C illustrated in FIG. 2 include a WebTV® 206A, a personal digital assistant ("PDA") 206B, and a mobile telephone 206C. The computing devices 206A-206C may be associated with users 210A-210C, respectively. The illustrated computing devices 206A-206C should be considered as exemplary and not limiting. A computing device may be any one of a number of computing devices including, but not limited to, tablet personal computers, hand-held computing devices, personal digital assistants, mobile telephones, stand-alone memory devices, electronic devices having some type of memory, and the like.

In some embodiments of the invention, the computing system 200 further includes a proxy server 204. A proxy server 204 usually is a powerful PC or server, capable of conducting the computations that are necessary for the invention, thus relieving the computing devices from performing heavy computation work. The proxy server 204 hosts a software component that implements aspects of the invention. The software component, named herein a Web page converter program, receives Web page requests from the plurality of computing devices 206A, 206B, 206C through a network 208. The software component then loads the Web pages and converts them into semantic thumbnails that preserve the layout of the Web pages and contain readable texts. The approach of having a proxy server 204 host the software component for converting Web pages helps enable embodiments of the invention to serve different platforms, i.e., accepting requests from different types of computing devices. In such embodiments of the invention, the proxy server 204 downloads Web pages from the Web server 202 and processes them before rendering the Web pages to the requesting computing devices.

Other embodiments of the invention may not include a proxy server 204. The Web page converter program may exist in the Web server 202. In such embodiments, the Web page converter program running on the Web server 202 loads a Web page and converts the Web page before rendering the Web page to the requesting computing device. In some embodiments of the invention, the requesting computing device may be the Web Server 202 itself.

The Web page converter program may also exist on the computing device that requests a Web page. In such embodiments, the requesting computing device requests and downloads a Web page from the Web server 202. The Web page converter program on the requesting computing device then converts the Web page. Such a computing device requires enough computing power to handle the computations that are necessary for such embodiments of the invention.

The computing devices 206A-206C, the Web server 202, and the proxy server 204 depicted in FIG. 2 are configured to electronically communicate via the network 208. The network 208 may be a Local Area Network (LAN) or a larger network, such as a Wide Area Network (WAN) or the Internet. As known to those skilled in the art and others, the computer system 200 may be configured to exchange documents, commands, and other types of data between the computing devices 206A, 206B, 206C, the Web server 202, and the proxy server 204. As will be appreciated by those skilled in the art and others, the computer system 200 shown in FIG. 2 is a simplified example of one system suitable for implementing embodiments of the invention.

When software formed in accordance with aspects of the invention is implemented in a computer system 200 of the type illustrated in FIG. 2, the software provides a way for users of small form factor computing devices to easily view Web pages designed for larger computing devices. For example, in embodiments of the invention, a user of a computing device may request a Web page for display on the computing device. In response to receiving the request, the Web server 202 transmits the Web page to the proxy server 204. The proxy server 204 converts the Web page into a semantic thumbnail suitable for displaying on the requesting computing device. The semantic thumbnail displayed on the computing device requesting the Web page preserves the overall appearance of the Web page includes readable text segments. If desired, in some embodiments of the invention, a user may zoom in on the semantic thumbnail to get a more detailed view of the Web page. The detail view of the Web page provides the original and unabbreviated version of the Web page.

Figure 3:
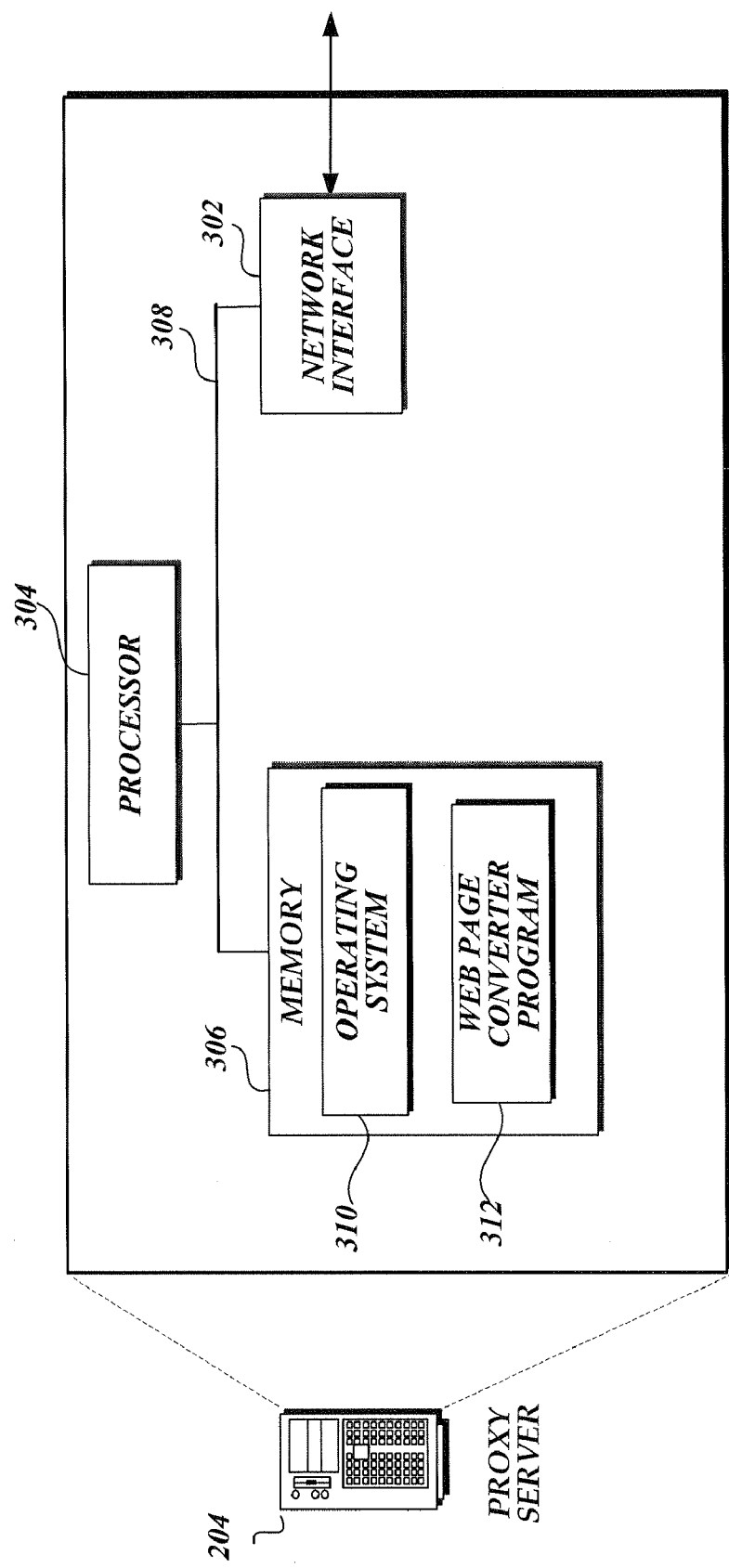
FIG. 3 is a functional block diagram illustrating an exemplary proxy server suitable for use in FIG. 2.

FIG. 3 illustrates an exemplary embodiment of a proxy server 204 suitable for use in FIG. 2. The proxy server 204 shown in FIG. 3 is connected to the network 208 (FIG. 2) through a network interface 302. The network interface 302 includes the necessary hardware and software to allow the proxy server 204 to communicate with other computing devices connected to the network 208 using one or more suitable communication protocols, such as TCP/IP.

The proxy server 204 shown in FIG. 3 includes a processor 304, a memory 306, all communicatively connected together and to the network interface 302 by a communication bus 308. The memory 306 generally comprises RAM, ROM, and/or permanent memory. The memory 306 stores an operating system 310 for controlling the general operation of the proxy server 204. The operating system 310 may be a general-purpose operating system such as a Microsoft® operating system, UNIX®, or Linux® operating system. For ease of illustration and because they are not important to an understanding of the invention, FIG. 3 does not show other typical components of a proxy server 204, such as a display, input/output interface, computer-readable medium drive, etc. Also, FIG. 3 does not show other computing devices that may be connected to the proxy server 204.

The memory 306 additionally stores program code and data for a Web page converter program 312. The Web page converter program 312 may be provided by a wholly separate application executing on the proxy server 204. The Web page converter program 312 in this example may communicate with the Web server 202, other computing device, or any of the computing devices 206A, 206B, 206C (FIG. 2) via the network interface 302. In some embodiments of the invention, the Web page converter program 312 receives Web page requests from the computing devices 206A, 206B, 206C. The program 312 loads the requested Web pages from the Web server 202. The program 312 then converts the Web pages into semantic thumbnails that preserve the overall appearance of the Web pages and provide readable text fragments. The program 312 serves the semantic thumbnails to the computing devices that requested the Web pages. Running the Web page converter program 312 on the proxy server 204, which preferably is a powerful machine such as a server or a personal computer, relieves the need for processing on computationally weak mobile devices. This approach also makes it easy to serve different platforms, such as the computing devices mentioned above. In other embodiments of the invention, the Web page converter program 312 may be provided by a software process hosted and operated by the Web server 202, other computing device, or any of the computing devices 206A, 206B, 206C that request content from the Web server 202.

Figure 1A:
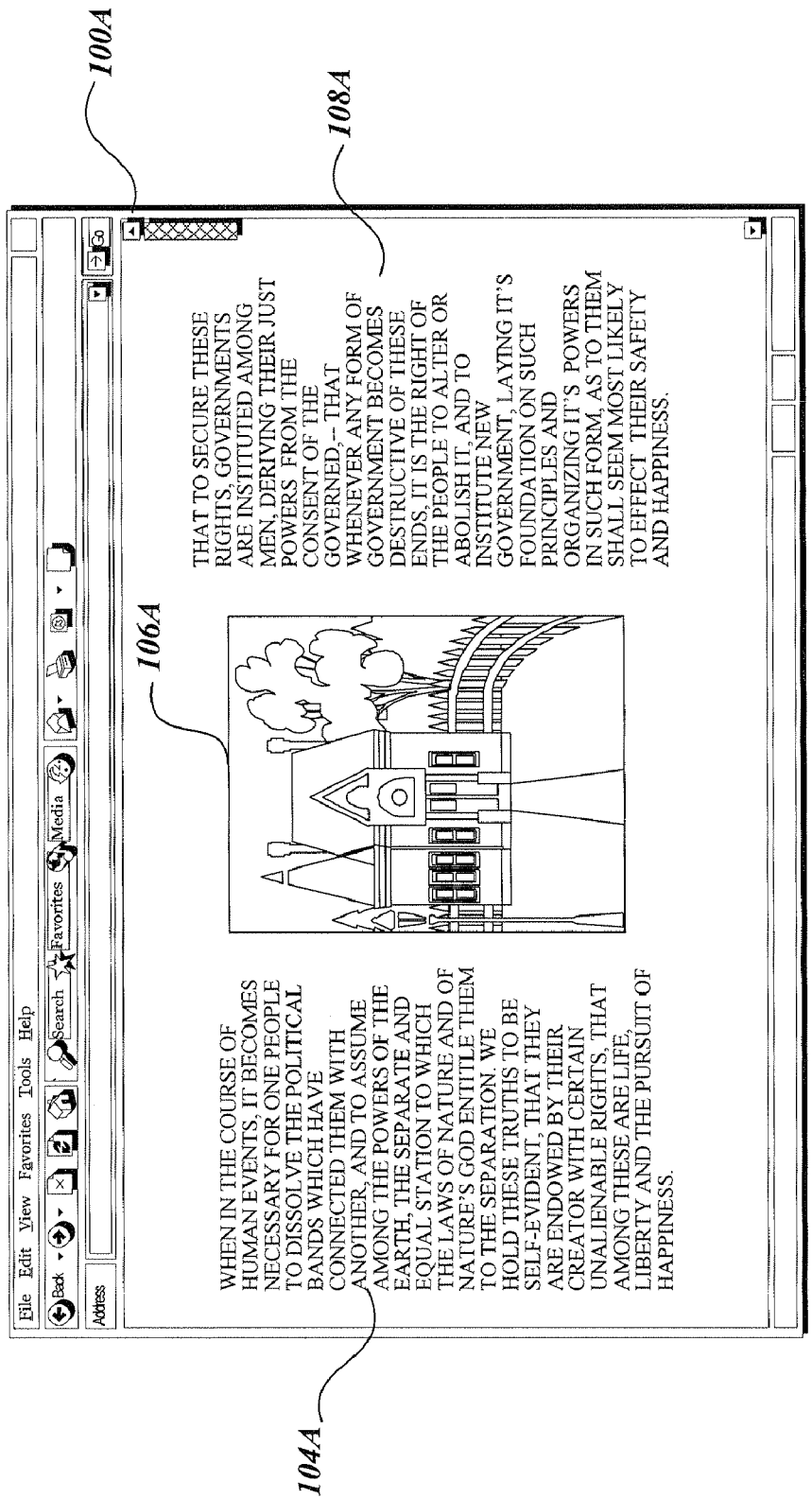
FIGS. 1A-1C are pictorial diagrams illustrating conventional ways of displaying a desktop Web page on small form factor computing devices.
Figure 1C:
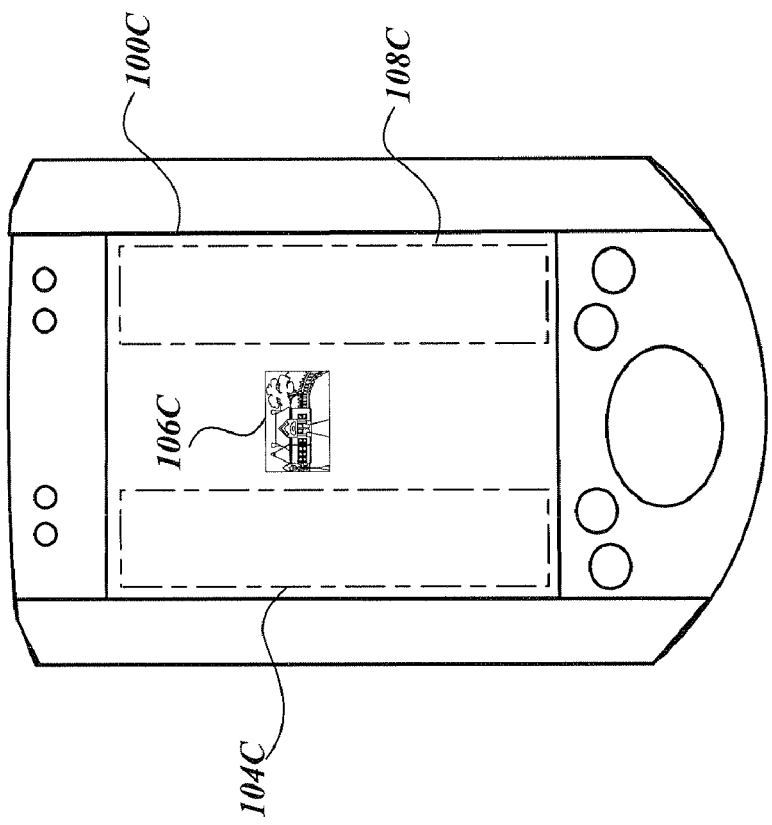
Figure 1B:
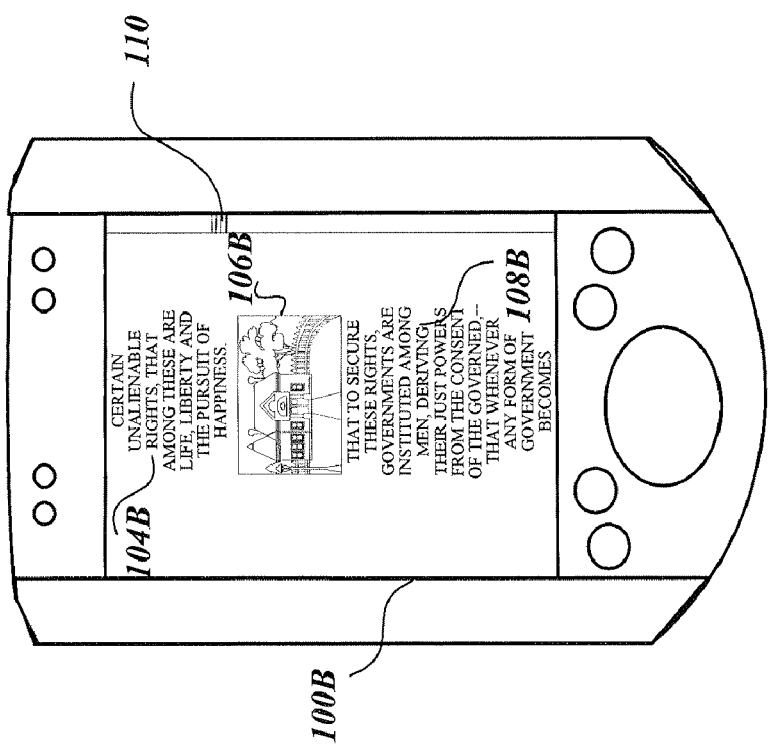
Figure 4:
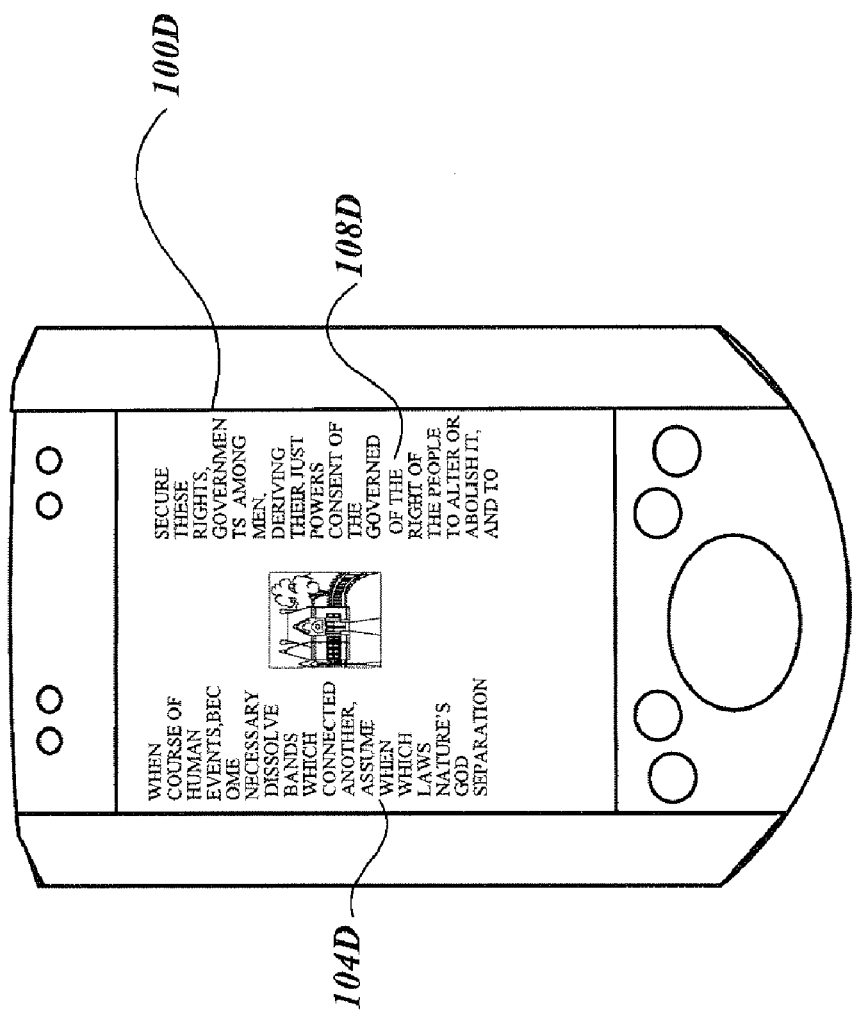
FIG. 4 is a pictorial diagram illustrating an exemplary display on a small form factor computing device.

FIG. 4 illustrates an exemplary semantic thumbnail 100D generated by the Web page converter program 312. The semantic thumbnail 100D is a miniature version of the desktop Web page 100A illustrated in FIG. 1A. As shown in FIG. 4, the semantic thumbnail 100D displays the Web page 100A in its entire width. This helps a user to identify the Web page 100A easily, leveraging on the user's possible prior experience with the Web page 100A. The semantic thumbnail 100D also enables a user to identify the main areas of interest in the Web page 100A without repeated zooming, which is often required when "reading" a traditional thumbnail 100C, illustrated in FIG. 1C and described above. More specifically, the schematic thumbnail 100D illustrated in FIG. 4 includes the text blocks 104A, 108A and the image 106A contained in the desktop Web page 100A shown in FIG. 1A. However, the text blocks 104D and 108D shown in FIG. 4 do not contain all of the content of the text blocks 104A and 108A shown in FIG. 1A. The text has been truncated or reduced in some manner (see the following description). The remaining text is readable in the semantic thumbnail 100D.

Figure 11:
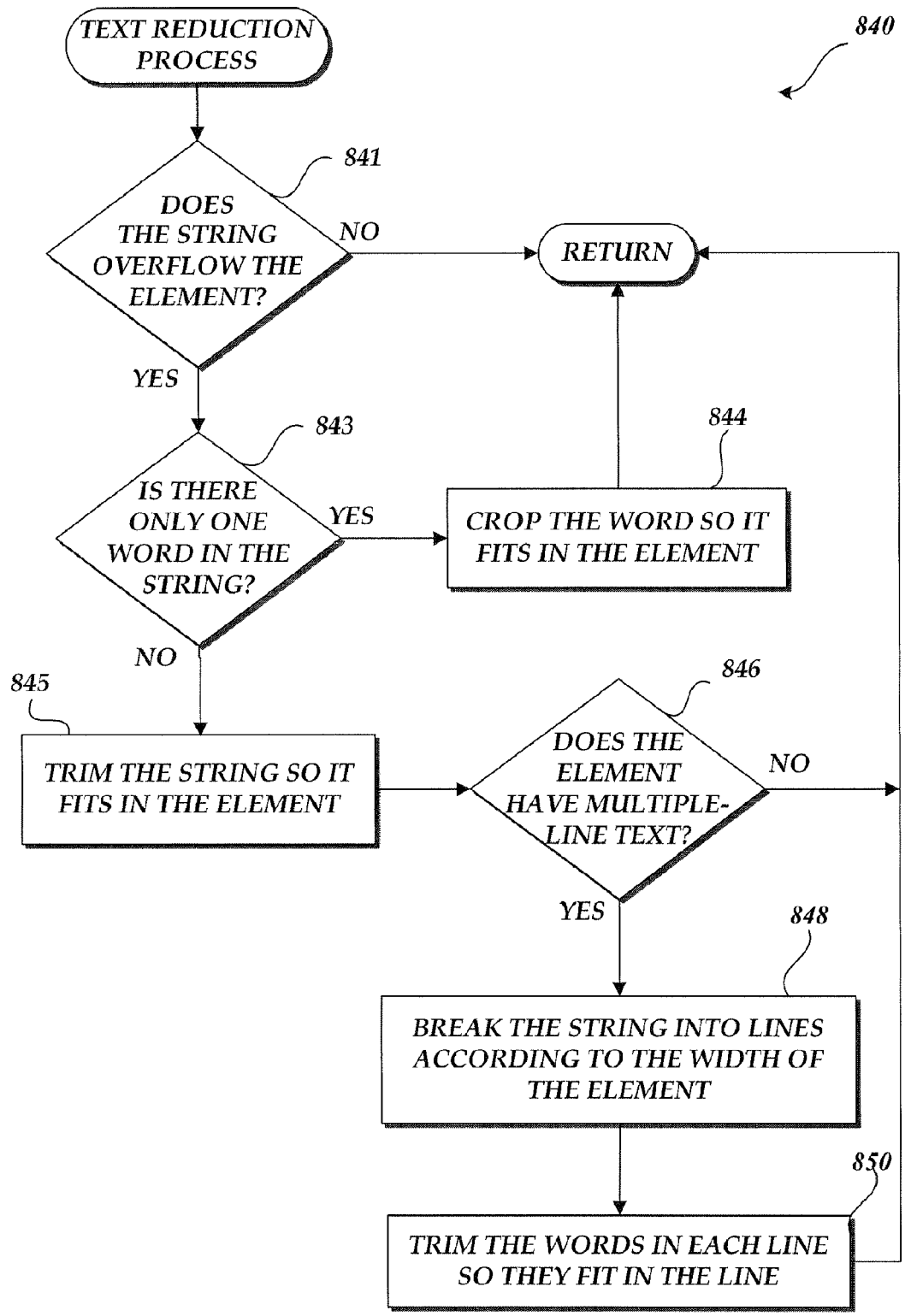

Similar to a traditional thumbnail 100C, semantic thumbnail 100D preserves the original page layout. This allows a user to identify the overall page structure and helps a user to recognize the previously viewed Web page 100A. However, unlike a traditional thumbnail 100C, the semantic thumbnail 100D provides readable text fragments that allow a user to understand the nature of the text in similar looking areas. The readable text minimizes or entirely eliminates the need for zooming or panning activity for the purpose of locating content of interest, as required by a traditional thumbnail 100C. In order to preserve the overall appearance of the Web page 100A and still make the text readable in the semantic thumbnail 100D, the text in the Web page 100A is reduced by summarization or cropping. FIG. 11 illustrates one exemplary implementation of a text reduction process and is discussed in detail below.

Figure 5:
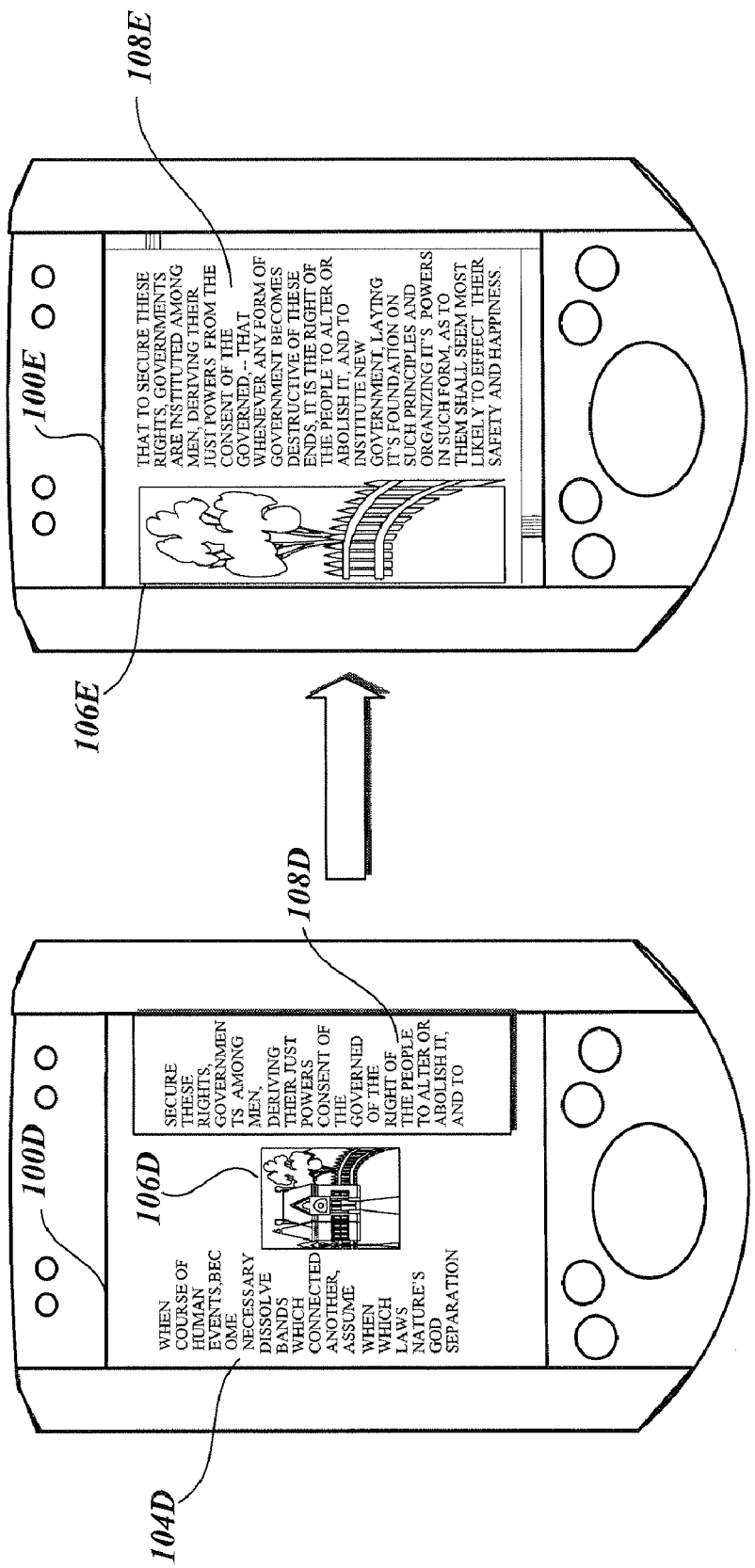
FIG. 5 is a pictorial diagram illustrating one aspect of the invention, namely, a semantic thumbnail view of a Web page being zoomed into a detail view of the Web page.

In some embodiments of the invention, when zoomed in, the semantic thumbnail 100D changes to a detail view displaying the original and unabbreviated version of the desktop Web page 100A. This zooming interaction, called semantic zoom, is a zooming-in process that replaces the abbreviated text in a semantic thumbnail 100D with complete text. FIG. 5 illustrates a semantic zoom. Here, a user has zoomed in on the text block 108D in the semantic thumbnail 100D. The semantic thumbnail 100D changes into the detail view 100E. The detail view 100E displays the original, unabbreviated version of the Web page 100A. In embodiments of the invention, the detail view 100E may represent the original, unabbreviated version of the Web page 100A in different forms, such as a desktop view, a single-column view, a fit-to-screen view, etc. Despite the change of representation during the semantic zoom, the semantic thumbnail 100D and the detail view 100E look similar enough for a user to maintain a sense of which areas in the semantic thumbnail 100D correspond to which area in the detail view 100E.

The semantic thumbnail 100D can be scaled arbitrarily, allowing it to fit the screen size of any computing device. For example, the semantic thumbnail 100D can be scaled to fit exactly the oval-shaped display screen of a computing device, such as a smart watch that can receive and display a semantic thumbnail. In the exemplary embodiment of the invention discussed here, as shown in FIG. 4, the semantic thumbnail 100D is scaled to fit the display width of a computing device. Further, because the font size of the abridged text can be adjusted according to the requirements of the computing device requesting the Web page, a semantic thumbnail 100D can be adapted to different computing devices. For example, PDA and smart phones usually have high resolution, and, thus, a crisp display. Adjusting the font size of a semantic thumbnail 100D displayed on such devices to the smallest readable size maximizes the amount of readable screen content. In contrast, display screens having low resolution will produce blurry semantic thumbnails when very small fonts are displayed. A CRT TV screen is an example of a relatively low-resolution display. When such displays are employed, the invention sets the minimum font size for the semantic thumbnail 100D at a higher value than when a higher resolution display is employed.

Figure 6:
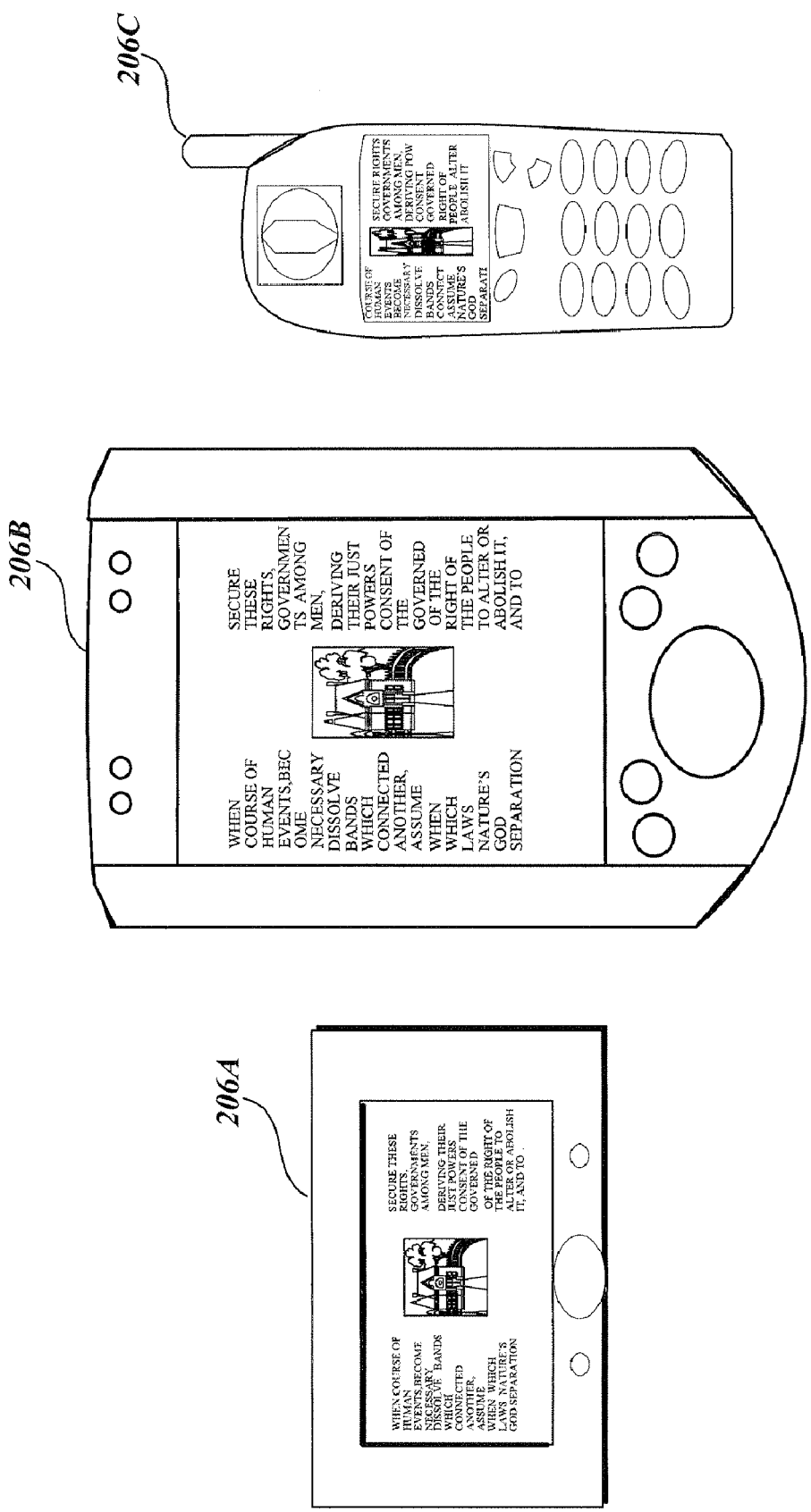
FIG. 6 is a pictorial diagram illustrating another aspect of the invention, namely, a semantic thumbnail being adapted to arbitrary screen sizes and font sizes.

In essence, the invention enables a semantic thumbnail 100D to be scalable to fit a variety of display screen sizes and types. FIG. 6 illustrates that a semantic thumbnail 100D can be adapted to different screen sizes and font sizes. More specifically, FIG. 6 illustrates how the semantic thumbnail 100D will appear on the screens of the computing devices 206A, 206B, 206C illustrated in FIG. 2. As shown in FIG. 6, the semantic thumbnail 100D adapts to different font sizes according to the screen space of the computing devices.

Figure 7:
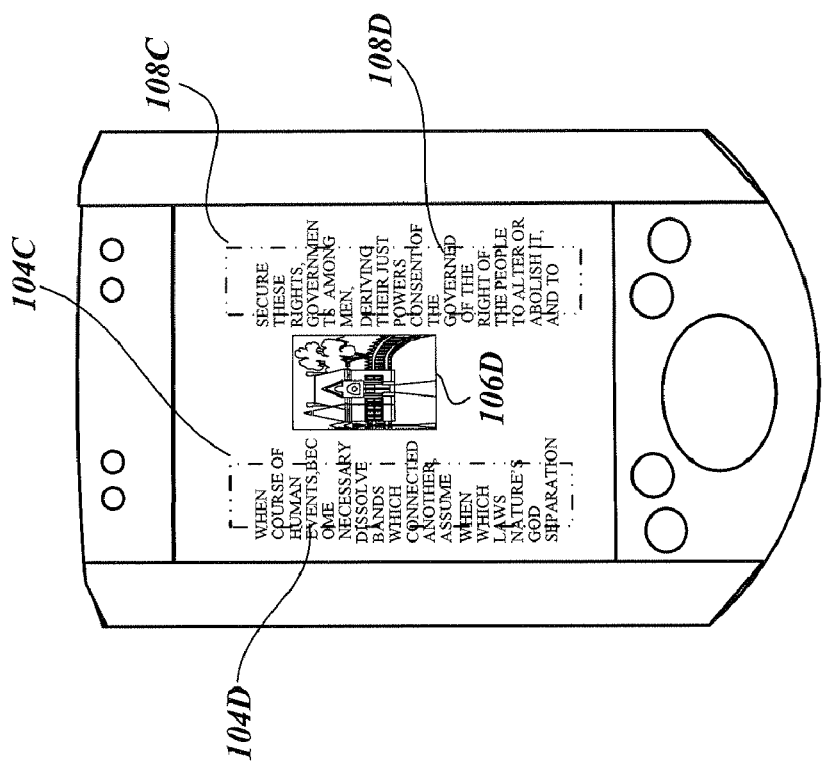
FIG. 7 is a pictorial diagram illustrating an alternative aspect of the invention, namely, a semantic thumbnail overlaying a traditional thumbnail depicted in FIG. 1C.

Some embodiments of the invention may incorporate an alternate design of the semantic thumbnail 100D. This alternate design, named herein a semantic thumbnail overlay, provides a traditional thumbnail 100C in the background of the display. The readable text fragments of a semantic thumbnail 100D overlay the traditional thumbnail 100D. To preserve the overall look and feel of the Web page, the invention makes the font color and cut line color of the overlaying text segments correspond to the font color and background color of that text within the traditional thumbnail 100C in the background. In one exemplary embodiment of this alternate design, the area of the overlaying text was extended by three pixels, feathered with one pixel, and then blurred. To make an overlaying text stand out more, preferably, the overlaying text is surrounded with a background-colored cut line one pixel wide. To reduce the visual interference between the overlaying text and the traditional thumbnail in the background, the area on which the overlaying text resides is blurred. FIG. 7 illustrates such an alternative design. It shows that the text blocks 104C, 108C in the traditional thumbnail 100C are used as the background, on which the readable text segments 104D, 108D of the semantic thumbnail 100D are displayed.

Figure 8:
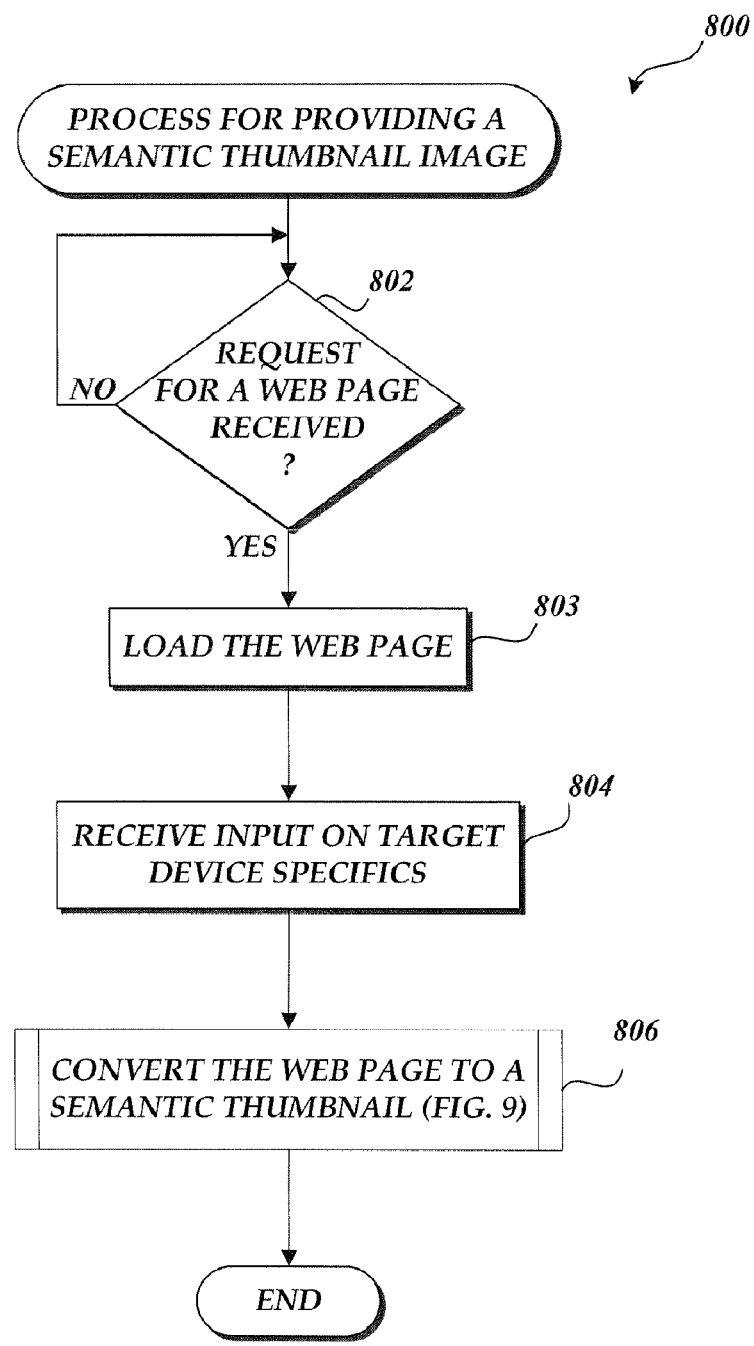
FIG. 8 is a flow diagram illustrating one exemplary process for providing a semantic thumbnail of a Web page for a computing device.

FIG. 8 provides an exemplary process 800 for converting a Web page into a semantic thumbnail. This process 800 may be implemented in the Web page converter program 312 illustrated in FIG. 3. As noted above, the Web page converter program 312 converts a Web page into a semantic thumbnail that preserves the overall appearance of the Web page and disambiguates (clarifies) the text content of the Web page.

Upon receiving a request for a Web page from a computing device (hereinafter "target device") (see decision block 802), the exemplary process 800 loads the requested Web page. See block 803. In embodiments of the invention where the Web page converter program 312 resides on a system that is separate from the Web server 202, such as a proxy server 204 or a computing device, the process 800 downloads the requested Web page from the Web server 202 that hosts the Web page. In embodiments of the invention where the Web Server 202 itself is the requesting computing device, no action of downloading the Web page is necessary. In embodiments of the invention, display parameters of the semantic thumbnail are provided. See block 804. As a result, the process 800 receives information such as the target width of the semantic thumbnail, the minimum font size that enables the text in the semantic thumbnail to be readable on the target device, etc. After receiving specific information about the semantic thumbnail, the process 800 then proceeds to a process 806 that converts the Web page into a semantic thumbnail. See block 806.

Figure 9:
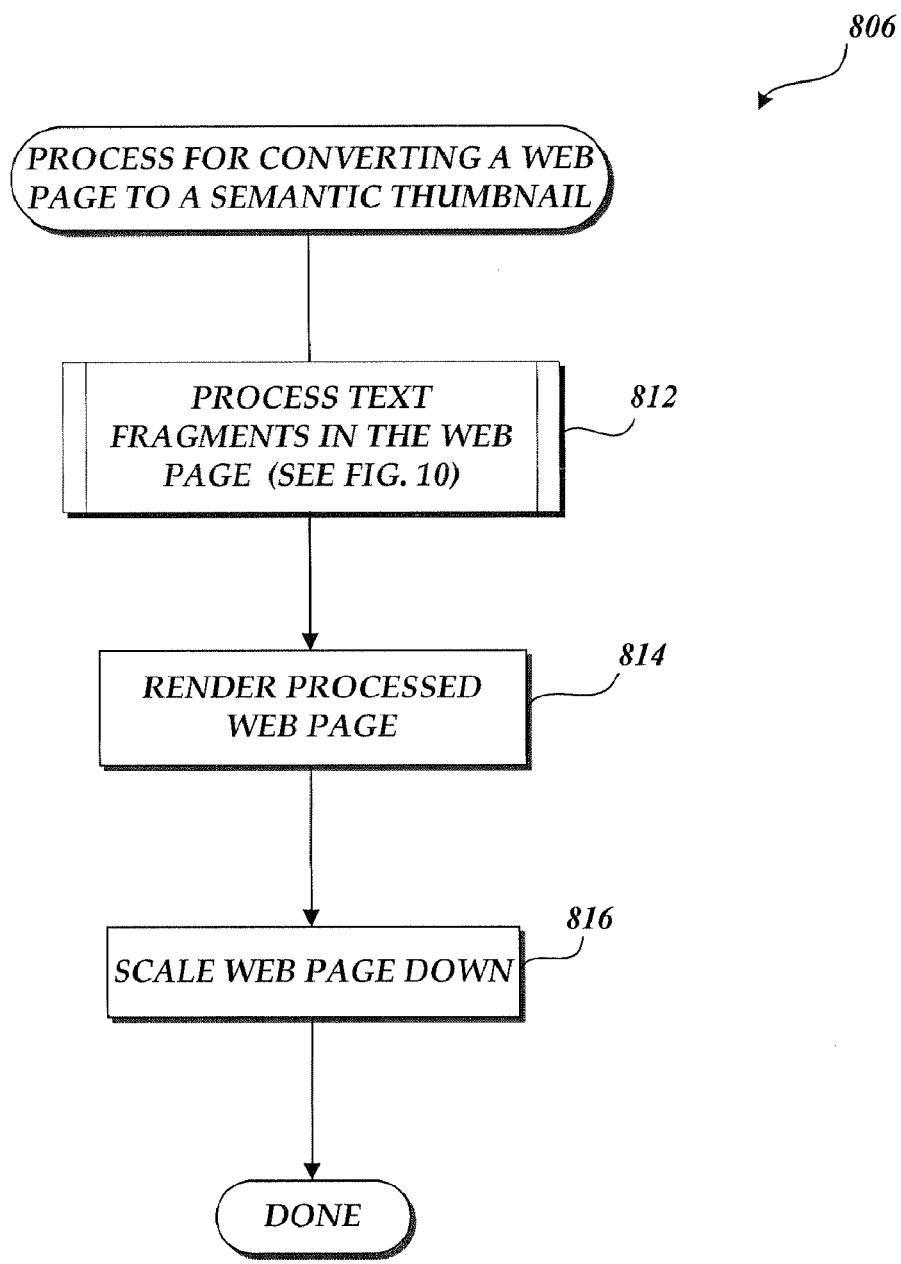
FIG. 9 is a flow diagram illustrating one exemplary implementation of a process for converting a Web page to a semantic thumbnail as suitable for use in FIG. 8.
Figure 10:
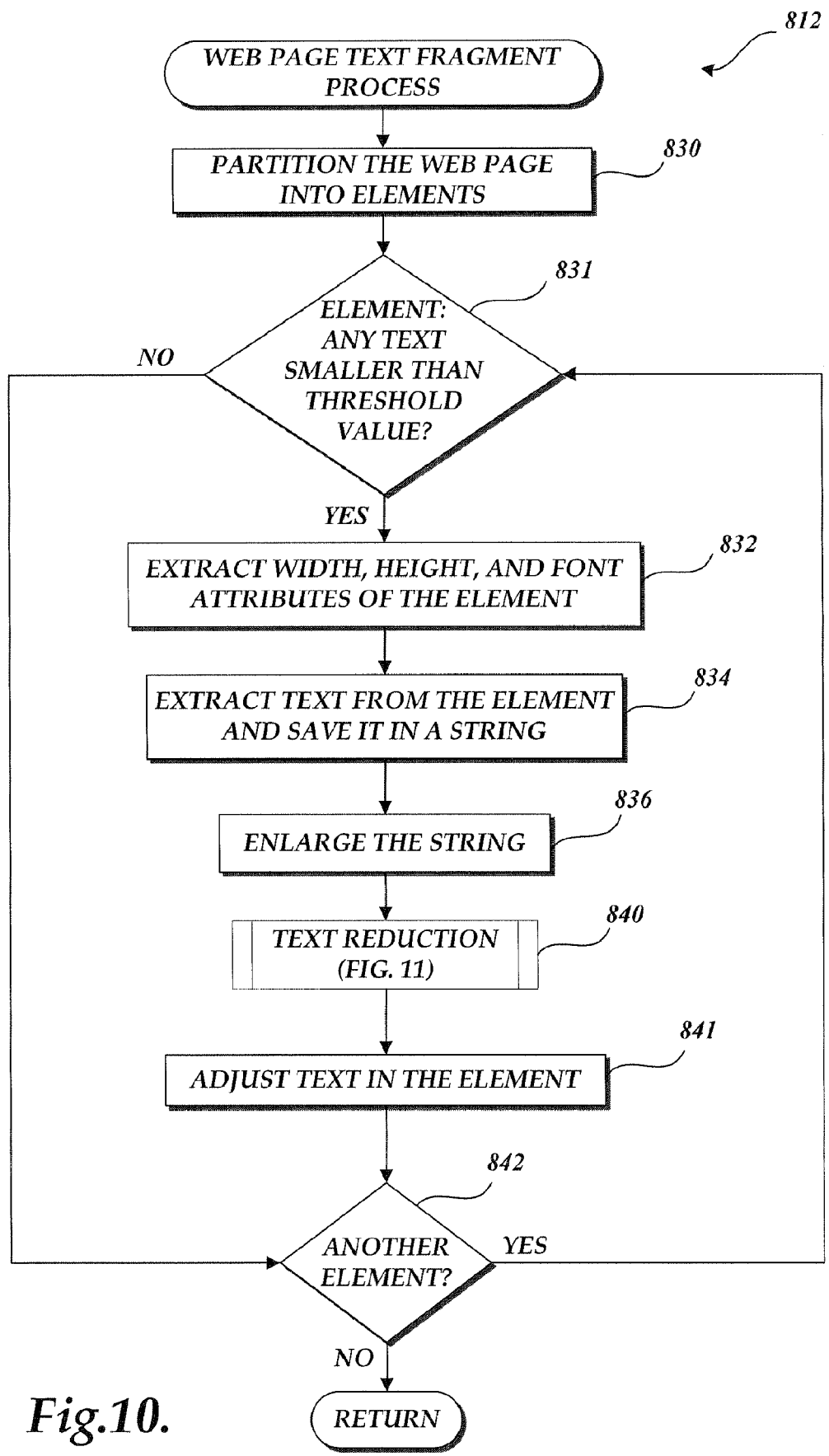
FIGS. 10 and 11 are flow diagrams illustrating one exemplary implementation of a process for processing text segments in a desktop Web page to make them readable in a semantic thumbnail.

FIG. 9 illustrates one exemplary implementation of the process 806. In FIG. 9, the process 806 starts by executing a routine 812, an example of which is shown in FIGS. 10 and 11 and described below, that ensures all text in the semantic thumbnail is readable. After executing the routine 812, the process 806 proceeds to render the resultant Web page. See block 814. The process 806 then proceeds to scale the resultant Web page so it may be displayable on the target device. See block 816. In embodiments of the invention, when the target device has a scaling capability, the process 806 lets the target device scale the Web page. Consequently, the process 806 outputs a converted HTML page. This page has the structure of a semantic thumbnail, i.e., it contains abbreviated but enlarged text, but the page is still as big as the original page. In some embodiments of the invention, if the target device does not have scaling capability, the process 806 scales the processed Web page and saves it as a bitmap for direct display by the target device.

Different embodiments of the invention may execute the three procedures included in process 806 in different sequences than the one illustrated in FIG. 9. For example, some embodiments of the invention first scale the Web page to, for example, the target width of the semantic thumbnail. It then processes text segments in the scaled Web page to ensure the readability of the content. It then renders the semantic thumbnail. In other embodiments of the invention, the text segments in a Web page are first processed to ensure readability of the content in the Web page once it is displayed on the target device. The processed Web page is then rendered and scaled.

FIGS. 10 and 11 illustrate one exemplary implementation of the routine 812 that ensures all text in the resultant semantic thumbnail is readable. As illustrated in FIG. 10, all text that is smaller than a threshold value is enlarged. Enlarged text typically occupies more lines than it did in its original font size. To preserve the line count, as illustrated in FIG. 11, words are removed or cropped until the total numbers of lines in the page are preserved.

The routine 812 (FIG. 10) first partitions the requested Web page into elements. See block 830. In embodiments of the invention, the partition is done by recursively traversing the Web page's Document Object Model. A Web page's Document Object Model allows programs and scripts to dynamically access and update the content objects contained by the Web page. The content objects of a Web page include elements and hyperlinks, for example. In embodiments of the invention, elements comprise paragraphs of text, input boxes, option boxes, or other elements specified in a style sheet.

The routine 812 then iterates through all the elements of the Web page. For each element, the routine 812 performs the following actions. It first checks to see if any text in the element is smaller than a threshold value. See decision block 831.

In the exemplary embodiment of the invention, in the case that the Web page has been scaled, the threshold value is the minimum font size. The minimum font size ensures a text to be identifiable on the target device. In embodiments of the invention, the minimum font size may be higher than what is necessary to display readable text on the target device. In the case that the Web page has not been scaled, the threshold value is the intermediate font size. The intermediate font size guarantees that if text with the intermediate font size were scaled, the resulting text would have the minimum font size. For example, if the target width of the semantic thumbnail is 240 pixels, the minimum font size is 7 pixels, and the Web page is 800 pixels wide, then the scaling factor for scaling the Web page into a semantic thumbnail is 3.3333 (800 pixels/240 pixels). Consequently the intermediate font size would be 23.33 (7 pixels times 3.333).

As shown in FIG. 10, if any text in the element is smaller than a threshold value, the text is processed, i.e., enlarged and trimmed so it fits well into the element. The processing of text may be done within the element itself. For example, the text may be enlarged and words in the text are removed. However, this approach may require repeated rendering of the page in order to examine whether the processed text fits well into the element. An alternative approach is to extract the text in the element into a string. The text in the string is then processed to ensure it fits into the width of the element in the page. Then, the text in the element is compared with the text in the string to ensure that the text in the element is the same as the text in the string. The advantage of this approach is that the page itself does not have to be rendered repeatedly to verify whether the text in the element fits well into the width of the element. FIG. 10 illustrates the alternative approach. The illustrative example in FIG. 10 is not intended to be exhaustive or to limit the invention to the precise form disclosed. People skilled in the art or related fields should understand that alternative approaches might be used to process the text in an element so it fits well into the width of the element.

In FIG. 10, if the answer to decision block 831 is YES, meaning that the text in the element is smaller than the threshold value, the routine 812 proceeds to extract the width, height, and font attributes of the element. See block 832. From these attributes, the number of lines of text in this element is inferred, for example, by dividing element height by font height. In embodiments of the invention, the routine 812 then extracts the text from the element and stores the text in a string. See block 834. The text in the string is enlarged to the font size specified by the device-specific threshold. See block 836. Next the routine 812 proceeds to a text reduction process 840 that ensures the enlarged string will fit in the width of the element. FIG. 11 illustrates one exemplary implementation of the process 840 and will be discussed in detail later. As known by the ordinary skilled in the art and other related fields, the enlarged string can also be trimmed according to spatial constraints other than the width of the element. For example, the expansion of the font size of text in an element may cause the element to expand vertically. One spatial constraint can be that the vertical expansion of the element caused by increase in font size of the text should be no more than twice the number of lines occupied by the element originally.

After executing the text reduction process 840, the routine 812 proceeds to adjust text in the element so that both the content and font size of the text matches what is in the string. See block 841. The routine 812 then proceeds to check if there is another element to be processed for the requested Web page. See decision block 842. In the case there is one, the routine 812 loops back to decision block 831. If the routine 812 has processed all the elements in the Web page, the routine 812 returns.

FIG. 11 illustrates one exemplary implementation of the text reduction process 840 that ensures text in an enlarged string will fit in the width of the element. The process 840 first proceeds to check if the enlarged string would cause a text overflow in the element. See decision block 841. If the answer is NO, the process 840 returns. If the answer is YES, the process 840 proceeds to check if there is only one word in the element. See decision block 843. If the answer to decision block 843 is YES, the process 840 crops the word until it fits in the width of the element. See block 844. The process 840 then returns.

If there are multiple words in the enlarged string, the process 840 trims the enlarged string so it fits in the width of the element. See block 845. Some embodiments of the invention assume that words with the highest frequencies of appearances in the language that the string is written in are of the least significance. Such words include "a," "the," "in," etc. In trimming the enlarged string, the process 840 removes words with the highest frequencies of appearances in the language until the remaining words fit in the width of the element.

In embodiments of the invention, the area of an element is estimated by multiplying the width of the element by the number of text lines in the element. In the case that the element has multiple lines of text (see decision block 846), the process 840 trims the enlarged string further by breaking the string into multiple lines of text according to the width of the element. See block 848. The process 840 then proceeds to remove more words according to the frequencies of their appearances in the language until the remaining words fit in each line of the element. See block 850. The process 840 then returns. During the process of removing words from the string, if it comes to the situation that the element does not have enough room to even accommodate a single word, a word is selected and cropped to fit the space constraints.

Other embodiments of the invention trim the enlarged string by preserving only the words that occur frequently in the string, but rarely in the language that the string is written in. Alternatively, trimming the enlarged string is done by preserving special terms, such as search terms or terms contained in the user profile describing interests of the current user of the target device.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for converting a page formed of discrete elements into a semantic thumbnail, comprising:
   (a) receiving information about display parameters of a semantic thumbnail version of the page, wherein the semantic thumbnail preserves the overall appearance of the page, and displays text in readable form wherein the semantic thumbnail has a target width and wherein the display parameters include:
      (i) the target width of the semantic thumbnail; and
      (ii) a minimum font size that ensures text to be readable on a computing device; and
   (b) based on the display parameters, converting the page into the semantic thumbnail, wherein converting the page into a semantic thumbnail includes processing text in the page and scaling the page and wherein processing text in the page includes:

(i) partitioning the page into elements;

(ii) calculating a threshold value, which is the minimum font size if the page has been scaled, and is the result of multiplying the minimum font size by the display width of the page and dividing the product by the target width of the semantic thumbnail if the page has not been scaled;

(iii) enlarging text in an element to a font size of the threshold value if the text has a font size that is smaller than the threshold value;

(iv) trimming the enlarged text so it fits the width of the element; and (v) repeating (iii) and (iv) for each element in the page.

2. The computer-implemented method of claim 1, wherein trimming the enlarged text includes removing words in each line that have the highest frequencies of appearances in the language that the enlarged text is written in so that the remaining text in each line fits the width of the element.

3. The computer-implemented method of claim 1, wherein trimming the enlarged text includes preserving words in each line that occur frequently in the enlarged text, but rarely in the language that the enlarged text is written in so that the preserved text in each line fits the width of the element.

4. The computer-implemented method of claim 1, wherein trimming the enlarged text includes:

(a) receiving information about a word in the enlarged text; and (b) preserving the word.

5. The computer implemented method of claim 1, wherein trimming the enlarged text includes, if the element cannot fit even one word, selecting a word in the enlarged text and cropping the word so that it fits into the element.

6. The computer-implemented method of claim 1, further comprising providing a detail view of an unabbreviated version of the page, upon receiving a zooming request on the semantic thumbnail.

7. The computer-implemented method of claim 1, further comprising overlaying the semantic thumbnail over a thumbnail of the page, wherein the thumbnail serves as a background for the semantic thumbnail.

8. A computing system comprising a plurality of computing devices for converting a page formed of discrete elements, into a semantic thumbnail that preserves the overall appearance of the page and displays text in readable form, is configured with computer-implemented instructions for:

(a) receiving information about display parameters of a semantic thumbnail version of the page, wherein the semantic thumbnail preserves the overall appearance of the page, and displays text in readable form wherein the semantic thumbnail has a target width and wherein the display parameters include:

(i) the target width of the semantic thumbnail; and (ii) the minimum font size that ensures text to be readable on a computing device;

(b) based on the display parameters, converting the page into the semantic thumbnail, wherein converting the page into a semantic thumbnail includes processing text in the page and scaling the page and wherein processing text in the page includes:

(i) partitioning the page into elements;

(ii) calculating a threshold value, which is the minimum font size if the page has been scaled, and is the result of multiplying the minimum font size by the display width of the page and dividing the product by the target width of the semantic thumbnail if the page has not been scaled;

(iii) enlarging text in an element to a font size of the threshold value if the text has a font size that is smaller than the threshold value;

(iv) trimming the enlarged text so it fits the width of the element; and (v) repeating (iii) and (iv) for each element in the page.

9. The computing system of claim 8, wherein trimming the enlarged text includes removing words in each line that have the highest frequencies of appearances in the language that the enlarged text is written in so that the remaining text in each line fits the width of the element.

10. The computing system of claim 8, wherein trimming the enlarged text includes preserving words in each line that occur frequently in the enlarged text, but rarely in the language that the enlarged text is written in so that the preserved text in each line fits the width of the element.

11. The computing system of claim 8, wherein trimming the enlarged text includes:

(a) receiving information about a word in the enlarged text; and (b) preserving the word.

12. The computing system of claim 8, wherein trimming the enlarged text includes, if the element cannot fit even one word, selecting a word in the enlarged text and cropping the word so that it fits into the element.

13. The computing system of claim 8, further comprising providing a detail view of an unabbreviated version of the page, upon receiving a zooming request on the semantic thumbnail.

14. The computing system of claim 8, further comprising overlaying the semantic thumbnail over a thumbnail of the page, wherein the thumbnail serves as a background for the semantic thumbnail.

15. A computer-readable medium containing computer-executable instructions that, when executed by a computer, cause the computer to perform a method for converting a page formed of discrete elements into a semantic thumbnail, the method comprising:

(a) receiving information about display parameters of a semantic thumbnail version of the page, wherein the semantic thumbnail preserves the overall appearance of the page, and displays text in readable form, wherein the semantic thumbnail has a target width and wherein the display parameters include:

(i) the target width of the semantic thumbnail; and (ii) the minimum font size that ensures text to be readable on a computing device;

(b) based on the display parameters, converting the page into the semantic thumbnail, wherein converting the page into a semantic thumbnail includes processing text in the page and scaling the page and wherein processing text in the page includes:

(i) partitioning the page into elements;

(ii) calculating a threshold value, which is the minimum font size if the page has been scaled, and is the result of multiplying the minimum font size by the display width of the page and dividing the product by the target width of the semantic thumbnail if the page has not been scaled;

(iii) enlarging text in an element to a font size of the threshold value if the text has a font size that is smaller than the threshold value;

(iv) trimming the enlarged text so it fits the width of the element; and (v) repeating (iii) and (iv) for each element in the page.

16. The computer-readable medium of claim 15, wherein trimming the enlarged text includes removing words in each line that have the highest frequencies of appearances in the language that the enlarged text is written in so that the remaining text in each line fits the width of the element.

17. The computer-readable medium of claim 15, wherein trimming the enlarged text includes preserving words in each line that occur frequently in the enlarged text, but rarely in the language that the enlarged text is written in so that the preserved text in each line fits the width of the element.

18. The computer-readable medium of claim 15, wherein trimming the enlarged text includes:

(a) receiving information about a word in the enlarged text; and (b) preserving the word.

19. The computer-readable medium of claim 15, wherein trimming the enlarged text includes, if the element cannot fit even one word, selecting a word in the enlarged text and cropping the word so that it fits into the element.

20. The computer-readable medium of claim 15, further, comprising providing a detail view of an unabbreviated version of the page, upon receiving a zooming request on the semantic thumbnail.

21. The computer-readable medium of claim 15, further comprising overlaying the semantic thumbnail over a thumbnail of the page, wherein the thumbnail serves as a background for the semantic thumbnail.

\* \* \* \* \*